(12) United States Patent
Huang et al.

(10) Patent No.: US 9,749,594 B2
(45) Date of Patent: Aug. 29, 2017

(54) TRANSFORMATION BETWEEN IMAGE AND MAP COORDINATES

(75) Inventors: Chien-Min Huang, Clovis, CA (US); Wei Su, Clovis, CA (US); Frank Vaughn, Pleasanton, CA (US)

(73) Assignee: Pelco, Inc., Clovis, CA (US)

( * ) Notice: Subject to any disclaimer, the term of this patent is extended or adjusted under 35 U.S.C. 154(b) by 636 days.

(21) Appl. No.: 13/335,442

(22) Filed: Dec. 22, 2011

(65) Prior Publication Data

US 2013/0162838 A1  Jun. 27, 2013

(51) Int. Cl.
*G06T 7/73* (2017.01)
*H04N 7/18* (2006.01)
*G06K 9/00* (2006.01)

(52) U.S. Cl.
CPC .............. *H04N 7/181* (2013.01); *G06T 7/73* (2017.01); *G06K 9/00771* (2013.01); *G06T 2207/10016* (2013.01); *G06T 2207/20101* (2013.01); *G06T 2207/30232* (2013.01)

(58) Field of Classification Search
CPC ......... G01C 11/00; G01C 11/02; G01C 11/06; G06T 7/20; G06T 3/4038; G06T 7/0018; G06T 7/0028; G06T 2207/10081; G06T 2207/10088; G06T 2207/10116; G06T 17/00
See application file for complete search history.

(56) References Cited

U.S. PATENT DOCUMENTS

| | | | |
|---|---|---|---|
| 5,987,136 A | 11/1999 | Schipper et al. | |
| 6,522,325 B1 * | 2/2003 | Sorokin et al. | 345/427 |
| 6,757,445 B1 * | 6/2004 | Knopp | 382/285 |
| 6,898,298 B1 * | 5/2005 | Edanami | 382/104 |
| 7,103,236 B2 * | 9/2006 | Peterson | 382/294 |
| 7,385,626 B2 * | 6/2008 | Aggarwal et al. | 348/143 |
| 7,587,276 B2 * | 9/2009 | Gold et al. | 701/426 |
| 7,920,959 B1 * | 4/2011 | Williams | 701/117 |
| 8,094,944 B2 * | 1/2012 | Simon et al. | 382/195 |
| 8,111,904 B2 * | 2/2012 | Wallack et al. | 382/152 |

(Continued)

FOREIGN PATENT DOCUMENTS

| | | |
|---|---|---|
| CN | 101650176 A | 2/2010 |
| WO | 0213513 A1 | 2/2002 |

OTHER PUBLICATIONS

International Search Report and Written Opinion for PCT/US2012/069740, mailed Mar. 15, 2013.

(Continued)

*Primary Examiner* — Jay Au Patel
*Assistant Examiner* — Shadan E Haghani
(74) *Attorney, Agent, or Firm* — Hunter Clark PLLC

(57) ABSTRACT

Systems and methods for transformations between image and map coordinates, such as those associated with a video surveillance system, are described herein. An example of a method described herein includes selecting a reference point within the image with known image coordinates and map coordinates, computing at least one transformation parameter with respect to a location and a height of the camera and the reference point, detecting a target location to be tracked within the image, determining image coordinates of the target location, and computing map coordinates of the target location based on the image coordinates of the target location and the at least one transformation parameter.

24 Claims, 8 Drawing Sheets

(56) References Cited

U.S. PATENT DOCUMENTS

| | | | |
|---|---|---|---|
| 8,315,477 B2* | 11/2012 | Acree | 382/284 |
| 8,350,929 B2* | 1/2013 | Tsurumi | 348/239 |
| 8,368,695 B2* | 2/2013 | Howell et al. | 345/427 |
| 8,417,062 B2* | 4/2013 | Price et al. | 382/294 |
| 8,421,871 B2* | 4/2013 | Onoe et al. | 348/218.1 |
| 8,570,390 B2* | 10/2013 | Tsurumi | 348/222.1 |
| 8,577,604 B1* | 11/2013 | Ogale et al. | 701/450 |
| 8,582,810 B2* | 11/2013 | Campbell | 382/103 |
| 2004/0233274 A1* | 11/2004 | Uyttendaele et al. | 348/36 |
| 2006/0007308 A1* | 1/2006 | Ide et al. | 348/143 |
| 2008/0106594 A1* | 5/2008 | Thrun | 348/39 |
| 2008/0166017 A1* | 7/2008 | Ito et al. | G06K 9/00369 382/103 |
| 2009/0018769 A1* | 1/2009 | Poliak | 701/209 |
| 2010/0194859 A1* | 8/2010 | Heigl | 348/46 |
| 2011/0007134 A1* | 1/2011 | Knize et al. | 348/43 |
| 2012/0119879 A1* | 5/2012 | Estes et al. | G08B 13/19641 340/8.1 |

OTHER PUBLICATIONS

International Preliminary Report on Patentability for International Application No. PCT/US2012/069740, mailed Jul. 3, 2014, 6 pages.
State Intellectual Property Office of the P.R.C. (SIPO) 1st Office Action (original) and Search Report (translation) for Application No. 201280063959.9 dated Feb. 22, 2016, 16 pgs.
State Intellectual Property Office of the P.R.C. (SIPO) 1st Office Action (translation) for Application No. 201280063959.9 dated Feb. 22, 2016, 16 pgs.
State Intellectual Property Office of the P.R.C. (SIPO) 2nd Office Action (translation) for Application No. 201280063959.9 dated Oct. 19, 2016, 7 pgs.

* cited by examiner

TRANSFORMATION BETWEEN IMAGE AND MAP COORDINATES

BACKGROUND

Video surveillance systems are commonly used in combination with mapping applications in order to locate and track objects of interest within an area monitored by video cameras positioned at various locations within the area. In such an implementation, a target object is detected through video analytics processing, from which metadata are generated that relate to the location of the object relative to the view of a camera at which the object appears. This location is given using a coordinate system defined relative to the camera view. To facilitate mapping of the object, the view coordinates of the object are transformed into map coordinates, such as satellite positioning system (SPS) coordinates or the like.

Conventionally, the map location of an object is determined from image coordinates of the object associated with a camera at which the object appears by using 4-point or 9-point linear interpolation to derive the map coordinates from the image coordinates. However, these conventional linear interpolation techniques are associated with computationally difficult camera calibration procedures that reduce system efficiency. Further, linear interpolation of map coordinates associated with a given object from corresponding image coordinates using existing techniques often results in inaccurate map coordinates for the object.

SUMMARY

An example of a method of identifying map coordinates of a location within an image captured by a camera according to the disclosure includes selecting a reference point within the image with known image coordinates and map coordinates; computing at least one transformation parameter with respect to a location and a height of the camera and the reference point; detecting a target location to be tracked within the image; determining image coordinates of the target location; and computing map coordinates of the target location based on the image coordinates of the target location and the at least one transformation parameter.

Implementations of the method may include one or more of the following features. The at least one transformation parameter comprises a rotation angle and a tilt angle of the camera relative to the reference point. Computing a horizontal displacement angle and a vertical displacement angle from a center of the image to the target location within the image. Determining a position of the target location relative to an Earth-based coordinate system based on the horizontal displacement angle, the vertical displacement angle, the location and height of the camera, the rotation angle and the tilt angle. Computing a rotation matrix based at least in part on the rotation angle. The information relating to location and height of the camera comprises map coordinates of the camera, and computing the map coordinates of the target location further includes computing the map coordinates of the target location based on the rotation matrix, the map coordinates of the camera, and the map coordinates of the reference point. The target location is a location of an object detected in the image, and the method further includes tracking image coordinates and map coordinates of the object. The camera includes a varifocal optical system, and computing the at least one transformation parameter includes identifying a focal length of the camera and computing the at least one transformation parameter based on horizontal and vertical fields of view associated with the focal length of the camera.

An example of a target coordinate translation system according to the disclosure includes a camera configured to capture an image, where the camera has a known location and height and a system of image coordinates is defined with respect to the image; a calibration module communicatively coupled to the camera and configured to identify a reference point within the image with known image coordinates and map coordinates and to compute at least one transformation parameter with respect to the location and height of the camera and the reference point; an object tracking module communicatively coupled to the camera and configured to select a target location within the image and to identify image coordinates of the target location; and a coordinate transformation module communicatively coupled to the calibration module and the object tracking module and configured to compute map coordinates of the target location based on the image coordinates of the target location and the at least one transformation parameter.

Implementations of the system may include one or more of the following features. The at least one transformation parameter includes a rotation angle and a tilt angle of the camera relative to the reference point. The coordinate transformation module is further configured to compute a horizontal displacement angle and a vertical displacement angle from a center of the image to the target location within the image. The coordinate transformation module is further configured to determine coordinates of the target location relative to an Earth-based coordinate system based on the horizontal displacement angle, the vertical displacement angle, the location and height of the camera, the rotation angle and the tilt angle. The calibration module is further configured to compute a rotation matrix based at least in part on the rotation angle, and the system further includes a mapping module communicatively coupled to the coordinate transformation module and configured to identify map coordinates of the camera and to compute the map coordinates of the target location based on the rotation matrix, the map coordinates of the camera, and the map coordinates of the reference point. The camera includes a varifocal optical system, and the calibration module is further configured to identify a focal length of the camera and to compute the at least one transformation parameter based on horizontal and vertical fields of view associated with the focal length of the camera.

An example of a system for identifying map coordinates corresponding to a location within a captured image according to the disclosure includes a camera configured to capture an image, where the camera has a known location and height and a system of image coordinates is defined with respect to the image; calibration means, communicatively coupled to the camera, for selecting a reference point within the image with known image coordinates and map coordinates and computing at least one transformation parameter with respect to the location and height of the camera and the reference point; tracking means, communicatively coupled to the camera, for detecting a target location within the image and determining image coordinates of the target location; and mapping means, communicatively coupled to the calibration means and the tracking means, for computing map coordinates of the target location based on the image coordinates of the target location and the at least one transformation parameter.

Implementations of the system may include one or more of the following features. The at least one transformation parameter comprises a rotation angle and a tilt angle of the camera relative to the reference point. The mapping means is further configured to compute a horizontal displacement angle and a vertical displacement angle from a center of the image to the target location within the image and to determine a position of the target location relative to an Earth-based coordinate system based on the horizontal displacement angle, the vertical displacement angle, the location and height of the camera, the rotation angle and the tilt angle. The calibration means is further configured to compute a rotation matrix based at least in part on the rotation angle, and the mapping means is further configured to identify map coordinates of the camera and to compute the map coordinates of the target location based on the rotation matrix, the map coordinates of the camera, and the map coordinates of the reference point. The camera comprises a varifocal optical system, and the calibration means is further configured to identify a focal length of the camera and to compute the at least one transformation parameter based on horizontal and vertical fields of view associated with the focal length of the camera.

An example of a computer program product according to the disclosure resides on a processor-executable computer storage medium and includes processor-executable instructions configured to cause a processor to identify information relating to a camera and a system of image coordinates relative to an image captured by the camera; select a reference point within the image with known image coordinates and map coordinates; compute at least one transformation parameter with respect to location and height of the camera and the reference point; detect a target location to be tracked within the image; determine image coordinates of the target location; and compute map coordinates of the target location based on the image coordinates of the target location and the at least one transformation parameter.

Implementations of the computer program product may include one or more of the following features. The at least one transformation parameter includes a rotation angle and a tilt angle of the camera relative to the reference point, and the instructions configured to cause the processor to compute the map coordinates of the target location are configured to cause the processor to compute a horizontal displacement angle and a vertical displacement angle from a center of the image to the target location within the image and determine a position of the target location relative to an Earth-based coordinate system based on the horizontal displacement angle, the vertical displacement angle, the location and height of the camera, the rotation angle and the tilt angle. The instructions configured to cause the processor to compute the at least one transformation parameter are configured to cause the processor to compute a rotation matrix based at least in part on the rotation angle. The information relating to location and height of the camera includes map coordinates of the camera. The instructions configured to cause the processor to compute the map coordinates of the target location are configured to cause the processor to compute the map coordinates of the target location based on the rotation matrix, the map coordinates of the camera, and the map coordinates of the reference point.

Items and/or techniques described herein may provide one or more of the following capabilities, as well as other capabilities not mentioned. Coordinate transformation between an image-based coordinate system and a map-based coordinate system can be achieved with a single reference point, reducing the computational complexity of camera calibration. Location and tracking of objects on a map associated with a video surveillance system can be performed with increased accuracy. Intelligent and efficient location and tracking of objects within an area monitored by a video surveillance system may be provided. The overall efficiency of a video surveillance system that employs mapping applications can be increased. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for performing transformations between image coordinates associated with a camera in a video surveillance system to map coordinates.

Figure 1:
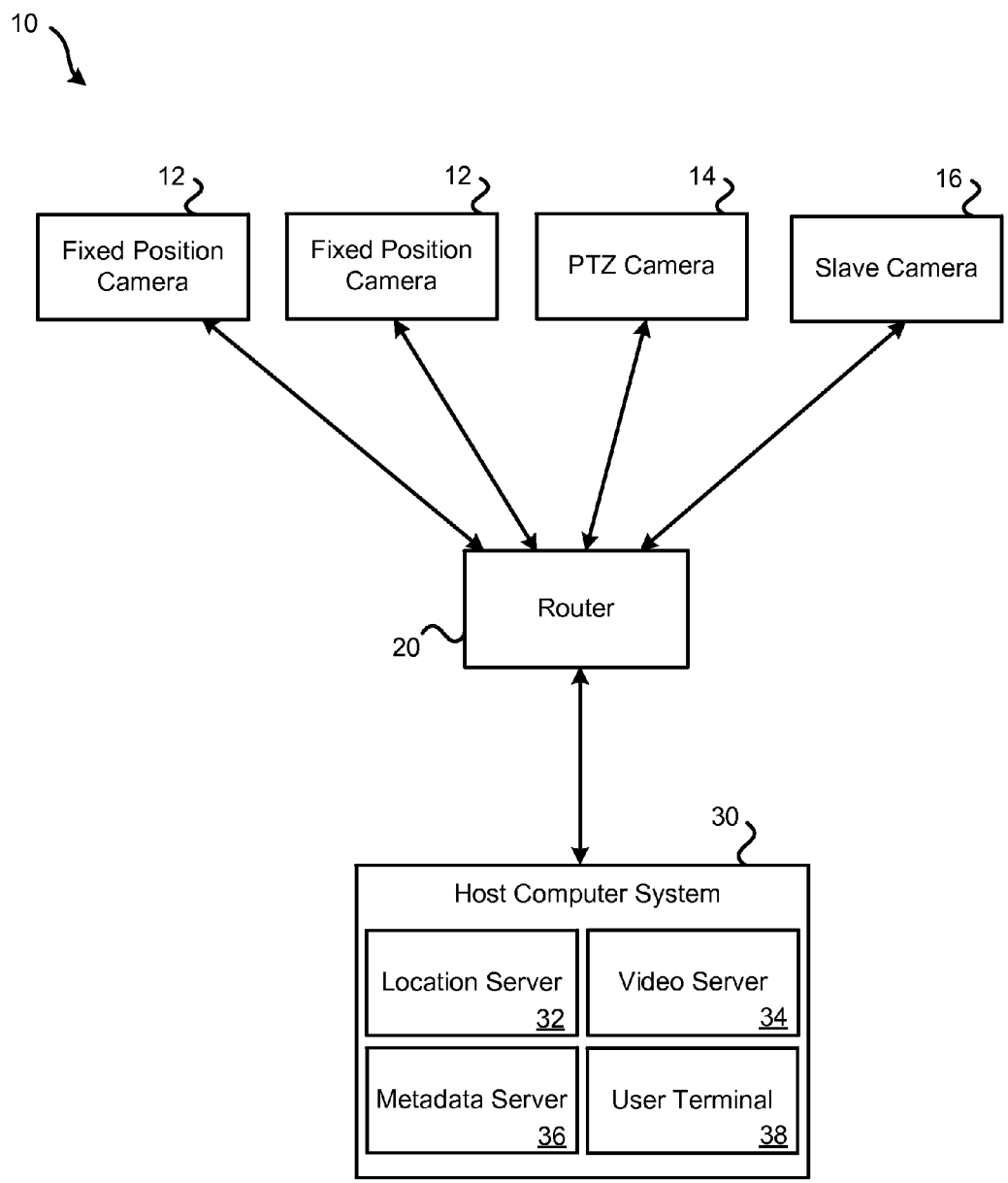
FIG. 1 is a block diagram of a security camera network.

FIG. 1 illustrates a block diagram of a security camera network 10. The security camera network 10 includes video cameras including fixed position cameras 12, PTZ (Pan-Tilt-Zoom) cameras 14, slave cameras 16, etc. Security camera networks may have zero, one, or more than one of each type of camera such that networks may have one or more cameras. For example, as shown in FIG. 1, the security camera network 10 includes two fixed position cameras 12, one PTZ camera 14 and one slave camera 16. Other quantities and/or configurations of cameras could also be used.

The security camera network 10 also includes a router 20. The fixed position cameras 12, PTZ cameras 14, and slave cameras 16 communicate with the router 20 using a wired connection (e.g., a local area network (LAN) connection) or a wireless connection. The router 20 communicates with a computing system, such as a host computer system 30. The router 20 communicates with the host computer system 30 using either a wired connection, such as a LAN connection, or a wireless connection. In some configurations, the host computer system 30 may be located at a single computing device and/or multiple computing devices (e.g., as a distributed computer system).

A fixed position camera 12 may be set in a fixed position, such as mounted to the eaves of a building to capture a video feed of the building's emergency exit. The field of view of such a fixed position camera, unless moved or adjusted by some external force, will remain unchanged. The fixed position camera 12 includes a digital signal processor (DSP) and/or one or more other processing entities to compress, process, and/or analyze images captured by the fixed position camera 12. For instance, as frames of the field of view of the fixed position camera 12 are captured, these frames are processed by a digital signal processor associated with the fixed position camera 12 to determine if one or more moving objects are present. For instance, a Gaussian mixture model may be used to separate a foreground that contains images of moving objects from a background that contains images of static objects, such as trees, buildings, and roads. The images of these moving objects are then processed to identify various characteristics of the images of the moving objects.

Using the images of respective detected objects, the fixed position camera 12 creates metadata associated with the images of each object. Metadata associated with, or linked to, an object contains information regarding various characteristics of the images of the object. For instance, the metadata includes information on characteristics such as: a location of the object, a height of the object, a width of the object, the direction the object is moving in, the speed the object is moving at, a color of the object, and/or a categorical classification of the object. Metadata may also include information regarding events involving moving objects.

Figure 2:
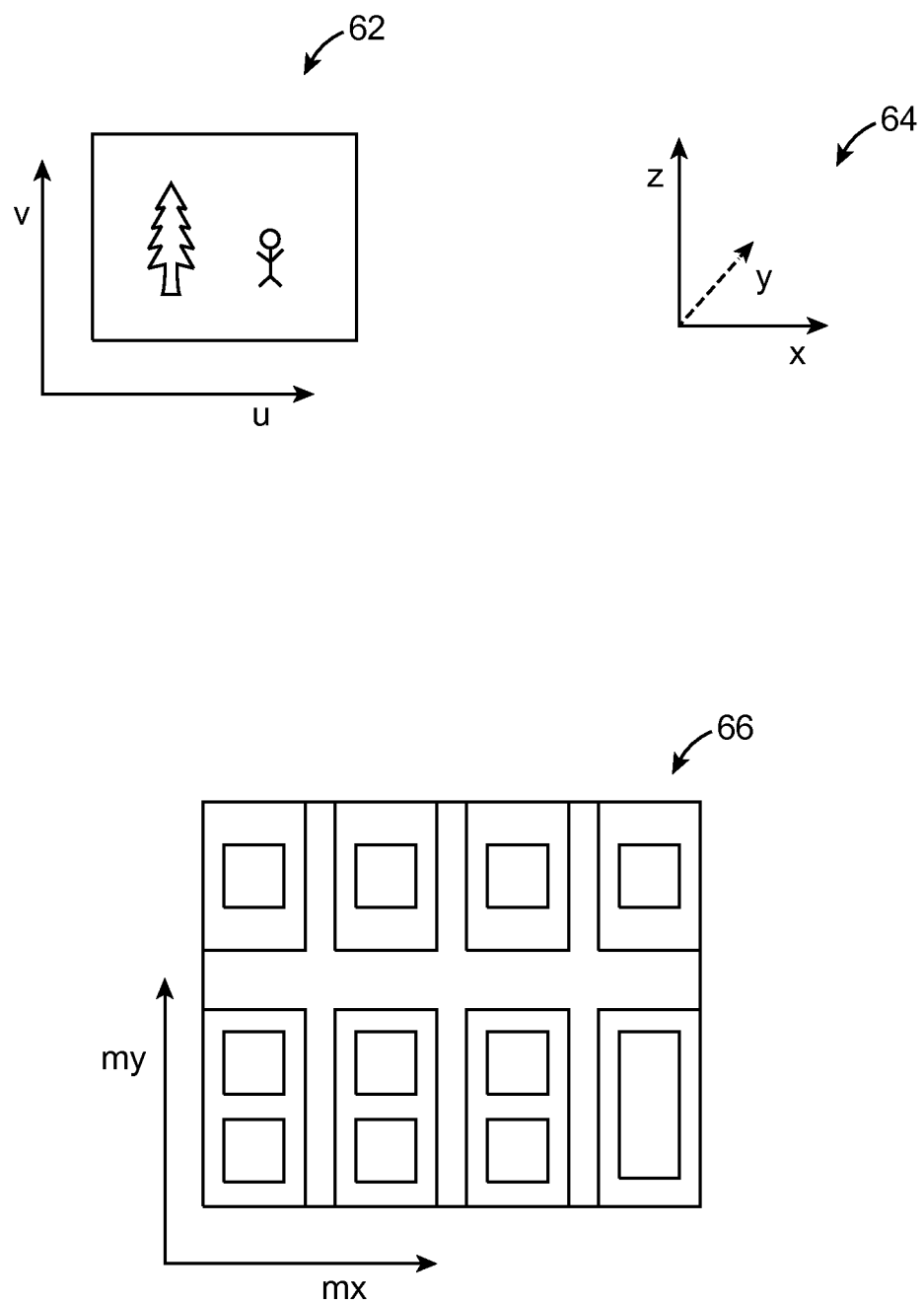
FIG. 2 is an illustrative view of coordinate systems associated with various operations performed within a video surveillance system.

Referring to the location of the object, the location of the object in the metadata is expressed as two-dimensional coordinates in a two-dimensional coordinate system associated with fixed position camera 12. Here, a two-dimensional (u, v) image coordinate system 62 is defined as shown in FIG. 2 that expresses the location of an object within a given image relative to that image. With respect to a particular object, these two-dimensional coordinates are associated with the position of the image of the object in the frames captured by the fixed position camera 12. The two-dimensional coordinates of the object may be determined to be a point within the frames captured by the fixed position camera 12. In some configurations, the coordinates of the position of the object is determined to be the middle of the lowest portion of the object (e.g., if the object is a person standing up, the position would be between the person's feet). As noted above and shown by image coordinate system 62 in FIG. 2, the two-dimensional coordinates have a u and v component, but no third component. In some configurations, the u and v components are measured in numbers of pixels. For example, a location of {613, 427} would mean that the middle of the lowest portion of the object is 613 pixels along the u-axis and 427 pixels along the v-axis of the field of view of the fixed position camera 12. As the object moves, the coordinates associated with the location of the object would change. Further, because this coordinate system is associated with the fixed position camera 12, if the same object is also visible in the fields of views of one or more other cameras, the location coordinates of the object determined by the other cameras would likely be different.

The height of the object may also be contained in the metadata and expressed in terms of numbers of pixels. The height of the object is defined as the number of pixels from the bottom of the image of the object to the top of the image of the object. As such, if the object is close to the fixed position camera 12, the measured height would be greater than if the object is further from the fixed position camera 12. Similarly, the width of the object is expressed in a number of pixels. The width of the objects can be determined based on the average width of the object or the width at the object's widest point that is laterally present in the image of the object. Similarly, the speed and direction of the object can also be measured in pixels.

The metadata determined by the fixed position camera 12 is transmitted to a host computer system 30 via a router 20. In addition to transmitting metadata to the host computer system 30, the fixed position camera 12 transmits a video feed of frames to the host computer system 30. Frames captured by the fixed position camera 12 can be compressed or uncompressed. Following compression, the frames are transmitted via the router 20 to the host computer system 30.

As further shown in FIG. 1, a security camera network 10 may include multiple fixed position cameras 12, which may function in a substantially similar manner to that described above. Fixed position cameras 12, assuming they are located in positions different from each other, have different points of view and fields of view. Thus, even if the same object is observed by multiple fixed position cameras 12 at the same instant in time, the perceived location, width and height of the object would vary between the different cameras.

The security camera network 10 also includes a PTZ camera 14. A PTZ camera 14 may pan, tilt, and zoom. As with the fixed position camera 12, the PTZ camera 14 can also include a digital signal processor and/or other processing devices. In order for the PTZ camera 14 to identify respective objects of interest, the PTZ camera 14 may have predefined points of view at which the PTZ camera 14 has analyzed the background and can distinguish the foreground containing moving objects from the background containing static objects. A user using the host computer system 30, e.g., via a user terminal 38, may be able to control the movement and zoom of the PTZ camera 14. Commands to control the PTZ camera 14 may be routed from the host computer system 30 to the PTZ camera 14 via the router 20. In some configurations, the PTZ camera 14 follows a set pan, tilt, and zoom pattern unless interrupted by a command from the host computer system 30.

The slave camera 16 may communicate with the host computer system 30 via the router 20. The slave camera 16 can either be a fixed position camera or a PTZ camera. The slave camera 16 is configured only to capture images and is not capable of identifying objects in the captured images. Instead, the slave camera 16 transmits either raw frames of a video feed or compressed frames of the video feed (e.g., processed via a video compressor) to the host computer system 30 via the router 20. The host computer system 30 processes frames received from the slave camera 16 to identify and track moving objects in the frames received from the slave camera 16.

The host computer system 30 includes a location server 32, a video server 34, a metadata server 36 and a user terminal 38. The location server 32 receives and stores locations of respective cameras 12-16 and/or other devices within the security camera network 10. The location server 32 can compute locations of devices within the security camera network 10 based on information obtained from a user and/or the devices themselves, or alternatively devices within the security camera network 10 can compute their own locations and submit these locations to the location server 32. Additionally, the location server 32 may, either independently or in combination with the metadata server 36, identify and track locations of respective objects monitored by the cameras 12-16. To this end, the location server 32 and/or metadata server 36, and/or the respective cameras 12-16 can utilize techniques for transforming between image and map coordinates as described below.

The video server 34 receives and stores compressed and/or uncompressed video from the cameras with which the host computer system 30 is in communication. The metadata server 36 receives, stores, and analyzes metadata received from the cameras communicating with the host computer system 30. The user terminal 38 allows a user, such as a security guard, to interact with the frames of the video feeds received from the cameras and any generated metadata associated with the video feeds. The user terminal 38 can display one or more video feeds to the user at one time. The user can select an object to track using the user terminal 38. For example, if the user is viewing frames of the video feed from a fixed position camera 12 and an object the user wishes to track appears in the field of view of the fixed position camera 12, the user can select the image of the object. The host computer system 30 then leverages the positions of the cameras 12-16 of the security camera network 10 as maintained by the location server 32 to track the object as it moves between the fields of view of the cameras 12-16. If the object is visible in the fields of view of multiple cameras, a preferable field of view is selected by the host computer system 30 based on predefined rules. The user can also control the PTZ camera 14 using the user terminal 38.

In some configurations, the functions of the location server 32, video server 34, metadata server 36 and user terminal 38 are performed by separate computer systems. In other configurations, these functions may be performed by one computer system. For example, one computer system may process and store device locations, video, and function as the user terminal 38. Alternatively, a first computing device may include the user terminal 38 and interact (e.g., through the router 20) with a second computing device that includes the location server 32, video server 34 and/or metadata server 36.

Locations within a video surveillance system are expressed in terms of coordinates given in various coordinate frames, as illustrated by FIG. 2. For instance, as described above, an image coordinate system 62 is utilized to express the position of a target location within an image corresponding to a camera view. A (u, v) coordinate system is utilized to express a horizontal component and vertical component, respectively, of location within the image. Additionally, an Earth-frame coordinate system 64 can be utilized to express the position of a target location with respect to the Earth in the x, y and z components. While an (x, y, z) Earth-frame coordinate system is utilized herein, other systems, such as a north-east-down (n-e-d) system could be utilized. The Earth-frame coordinate system 64 may be defined according to a predetermined reference orientation such as true north or magnetic north. If the system is defined according to true north, magnetic declination or other compensating factors can be utilized to express coordinates in the Earth-frame coordinate system 64 in reference to magnetic north, or vice versa.

Further, a map coordinate system 66 expresses the two-dimensional position of a target location with reference to a map of the underlying area. As used herein, $m_x$ and $m_y$ are utilized to denote the longitudinal and latitudinal components of the coordinate system, respectively; however, any other notation could be utilized. A map on which the map coordinate system 66 is based can be generated and/or defined according to any suitable positioning system, including but not limited to a satellite positioning system (SPS) such as GPS, GLONASS, Galileo, Beidou, etc., a terrestrial positioning system, etc.

Figure 3:
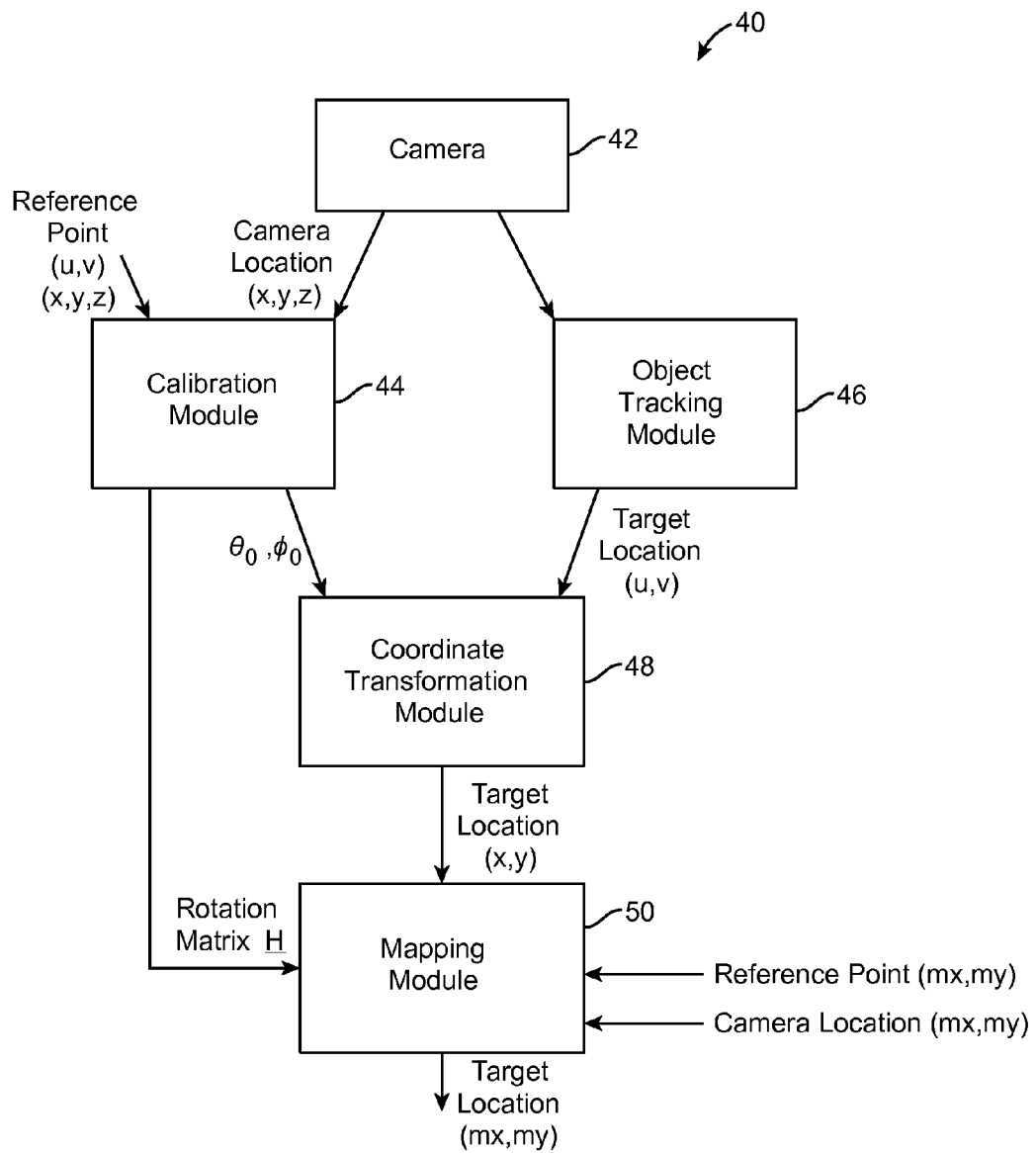
FIG. 3 is a block diagram of a system for mapping objects identified and tracked within a video surveillance system.

Referring next to FIG. 3, an example system 40 for mapping objects identified and tracked within a video surveillance system includes a camera 42, a calibration module 44, an object tracking module 46, a coordinate transformation module 48 and a mapping module 50. The camera 42 can be or otherwise implement functionality of a fixed position camera 12, a PTZ camera 14, a slave camera 16 or the like as generally described above. The other modules 44-50 within system 40 may be physically implemented within and/or otherwise associated with the camera 40, or alternatively they may be communicatively coupled to the camera 40 and/or each other by any suitable wired or wireless communication means. In the event that one or more of the modules 44-50 are not implemented by the camera 40, they may be implemented by any other suitable entity, such as a host computer system 30 or the like.

Calibration performed by the calibration module 44 begins by placing the camera 42 at a fixed location and looking down at a fixed direction. Given camera information, such as field of view, sensor size, camera height and location, image resolution, and other suitable information, the camera is placed at a fixed location and positioned to face downward at a fixed direction. One or more apparent points in the image are selected at the far side of the image, and the corresponding point is found on an associated map. From the camera parameters and the reference point(s), various transformation parameters are calculated to enable subsequent translation between image and map coordinates based on a single reference point. These transformation parameters include, e.g., a translation vector, a rotation angle and a tilt angle. Calculation of these parameters is described in more detail as follows.

Calibration pre-processing begins at the calibration module 44 by accepting input data including camera information and reference point information. As noted above, camera information includes, e.g., field of view, sensor size, camera position and installation height, image resolution, etc. Reference point information refers to the location of a selected point within an image captured by the camera 42 in image coordinates and Earth-frame coordinates. As defined herein, parameters relating to the camera are referred to by the following notations:

($S_w$, $S_h$): Width and height, respectively, of the sensor of the camera 42.

F: Focal length of the camera 42 (expressed using the same unit as the sensor size).

($\alpha$, $\beta$): Angles corresponding to half of the horizontal and vertical field of view of the camera 42, respectively.

($I_w$, $I_h$): Width and height (in pixels), respectively, of the image captured by the camera 42.

($P_w$, $P_h$): Size of one pixel in width and height, respectively (expressed using the same unit as the sensor size).

$A_i$, $A_s$, $A_p$: Aspect ratios of the image, sensor and pixel, respectively. The aspect rations are further defined as follows:

$$A_i = I_h/I_w, \; A_s = S_h/S_w, \; A_p = P_h/P_w = (S_h/I_h)/(S_w/I_w) = A_s/A_i,$$
$$\text{and } A_s = A_i \cdot A_p.$$

Parameters relating to the camera can be provided to the calibration module 44 as input, or alternatively the calibration module 44 can compute one or more camera-related parameters based on other known information. For instance, based on the above definitions, the parameters ($\alpha$, $\beta$), ($I_w$, $I_h$), ($S_w$, $S_h$), ($P_w$, $P_h$), and F exhibit the following relationships:

$$S_w = I_w \cdot P_w,$$
$$S_h = I_h \cdot P_h,$$
$$\tan(\alpha) = \frac{S_w}{2 \cdot F} = \frac{I_w \cdot P_w}{2 \cdot F}, \text{ and}$$
$$\tan(\beta) = \frac{S_h}{2 \cdot F} = \frac{I_h \cdot P_h}{2 \cdot F}.$$

Thus, if $(I_w, I_h)$, $(S_w, S_h)$, $(P_w, P_h)$ are known, and one of $\alpha$ and $\beta$ is known, the other one of $\alpha$ and $\beta$ can be computed using the following formulas:

$$\tan(\beta) = A_i \cdot A_p \cdot \tan(\alpha) = A_s \cdot \tan(\alpha)$$

In a first case of the above, given $\alpha$, $\beta$ is computed as follows:

$$\beta = \tan^{-1}(A_i \cdot A_p \cdot \tan(\alpha)) = \tan^{-1}(A_s \cdot \tan(\alpha))$$

Conversely, given $\beta$, $\alpha$ is computed as follows:

$$\alpha = \tan^{-1}[\tan(\beta)/(A_i \cdot A_p)] = \tan^{-1}[\tan(\beta)/(A_s)]$$

Figure 4:
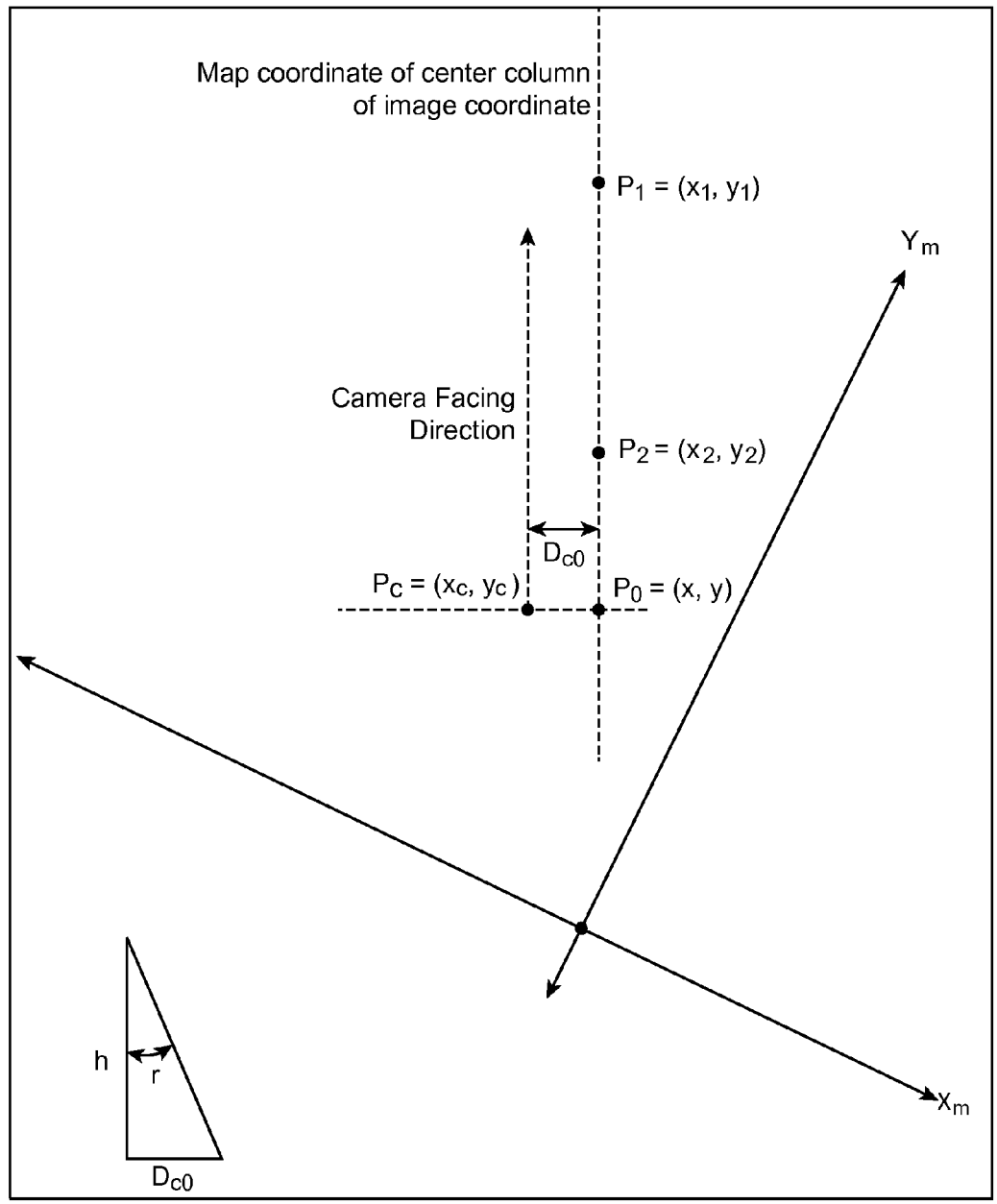
FIGS. 4-6 are illustrative views of coordinate transformations utilized by a mapping application for a video surveillance system.

Given the above camera parameters, if the camera 42 utilizes a varifocal optical system and the field of view of the camera 42 is not given as input, the calibration module 44 can calculate the field of view of the camera 42 as follows. Calculation of the horizontal field of view (HFOV) and vertical field of view (VFOV) of the camera 42 is performed based on two reference points (referred to herein as point 1 and point 2 or $P_1$ and $P_2$) with known image and map coordinates and the map coordinates of the camera 42. FIG. 4 illustrates the map coordinate $(X_m, Y_m)$ and the locations of the camera 42, point 1 and point 2 with respect to the map coordinates. Here, point 1 and point 2 are chosen as two points at the center of the image column. For the purposes of the field of view calculations, the following parameters are defined:

$(x_1, y_1)$: Map coordinates of point 1.
$(x_2, y_2)$: Map coordinates of point 2.
$(x_c, y_c)$: Map coordinates of the camera 42.
$(u_0, v_0)$: Image coordinates of the image center, e.g., $(u_0, v_0) = (I_w/2, I_h/2)$.
$(u_0, v_1)$: Image coordinates of point 1.
$(u_0, v_2)$: Image coordinates of point 2.
h: Height of the camera.
s: Length per map pixel, defined in terms of the same unit as the camera height.

It is assumed in the following calculations that $v_1 < v_2$. Further, point 1 and point 2 are defined to be on the ground such that their three-dimensional map coordinates are $(x_1, y_1, 0)$ and $(x_2, y_2, 0)$, respectively. Similarly, the three-dimensional map coordinates of the camera are $(x_c, y_c, h/s)$.

According to the above, the VFOV and HFOV of the camera 42 are calculated as follows. First, the angle $\angle P_1 C P_2$, also denoted as $\Delta t$ where C denotes the point location of the camera 42, is calculated as follows:

$$\Delta t = \cos^{-1}\left(\frac{(x_1 - x_c) \cdot (x_2 - x_c) + (y_1 - y_c) \cdot (y_2 - y_c) + h_0^2}{\sqrt{(x_1 - x_c)^2 + (y_1 - y_c)^2 + h_0^2} \cdot \sqrt{(x_2 - x_c)^2 + (y_2 - y_c)^2 + h_0^2}}\right).$$

$$h_0 = h/s$$

Next, a quadratic equation is defined and solved to find the focal length $F_v$ based on the vertical direction as follows:

$$F_v^2 \cdot \tan(\Delta t) + F_v \cdot (v_a - v_b) + v_a \cdot v_b \cdot \tan(\Delta t) = 0,$$

$$v_a = v_1 - v_0, \quad v_b = v_2 - v_0.$$

Based on the above, the VFOV and HFOV are computed as follows:

$$\text{VFOV} = 2 \cdot \tan^{-1}(I_h/(2 \cdot F_v)),$$

$$\text{HFOV} = 2 \cdot \tan^{-1}[\tan(\beta)/(A_i \cdot A_p)] = 2 \cdot \tan^{-1}[\tan(\beta)/(A_s)].$$

In addition to the HFOV and VFOV of the camera 42, the calibration module 44 can additionally compute the roll angle of the camera 42, denoted herein as r. The roll angle of the camera 42 is defined as the rotation angle of the camera 42 in the event that the camera 42 is not level. FIG. 4 illustrates the map coordinates of the center column of an image captured by the camera 42, e.g., the line passing through points 1 and 2 defined above. Based on these points, the roll angle r is computed as follows. First, the x and y components of the distance between points 1 and 2, denoted as $(\Delta x, \Delta y)$, are computed as follows:

$$\Delta x = x_1 - x_2, \quad \Delta y = y_1 - y_2.$$

Next, the map coordinates of the point $P_0$, denoted as $(x_0, y_0)$, are computed. The point $(x_0, y_0)$ is equivalent to the point $(x, y)$ in FIG. 4. The coordinates are computed using the following formulas:

$$x_0 = \frac{x_c \cdot (\Delta x)^2 + (y_c - y_1) \cdot \Delta x \cdot \Delta y + x_1 \cdot (\Delta y)^2}{(\Delta x)^2 + (\Delta y)^2},$$

$$y_0 = \frac{y_1 \cdot (\Delta x)^2 + (x_c - x_1) \cdot \Delta x \cdot \Delta y + y_c \cdot (\Delta y)^2}{(\Delta x)^2 + (\Delta y)^2}.$$

From the above, the roll angle is computed as a function of the distance $D_{01}$ from the camera to the center point of the camera image with respect to the ground. The distance $D_{01}$ corresponds to $D_{c0}$ as illustrated in FIG. 4. The roll angle is computed as follows:

$$D_{01} = s \cdot \sqrt{(x_c - x_0)^2 + (y_c - y_0)^2},$$

$$r = \tan^{-1}(D_{01}/h).$$

Using the above calculations, the calibration module 44 derives transformation parameters that are operable to convert image coordinates associated with a target location (e.g., the position of an object tracked by the object tracking module 46) to corresponding map coordinates. These parameters include, e.g., a rotation angle $\phi_r$ and tilt angle $\theta_0$ of the camera 42 relative to a reference point, a rotation matrix, or the like.

Figure 5:
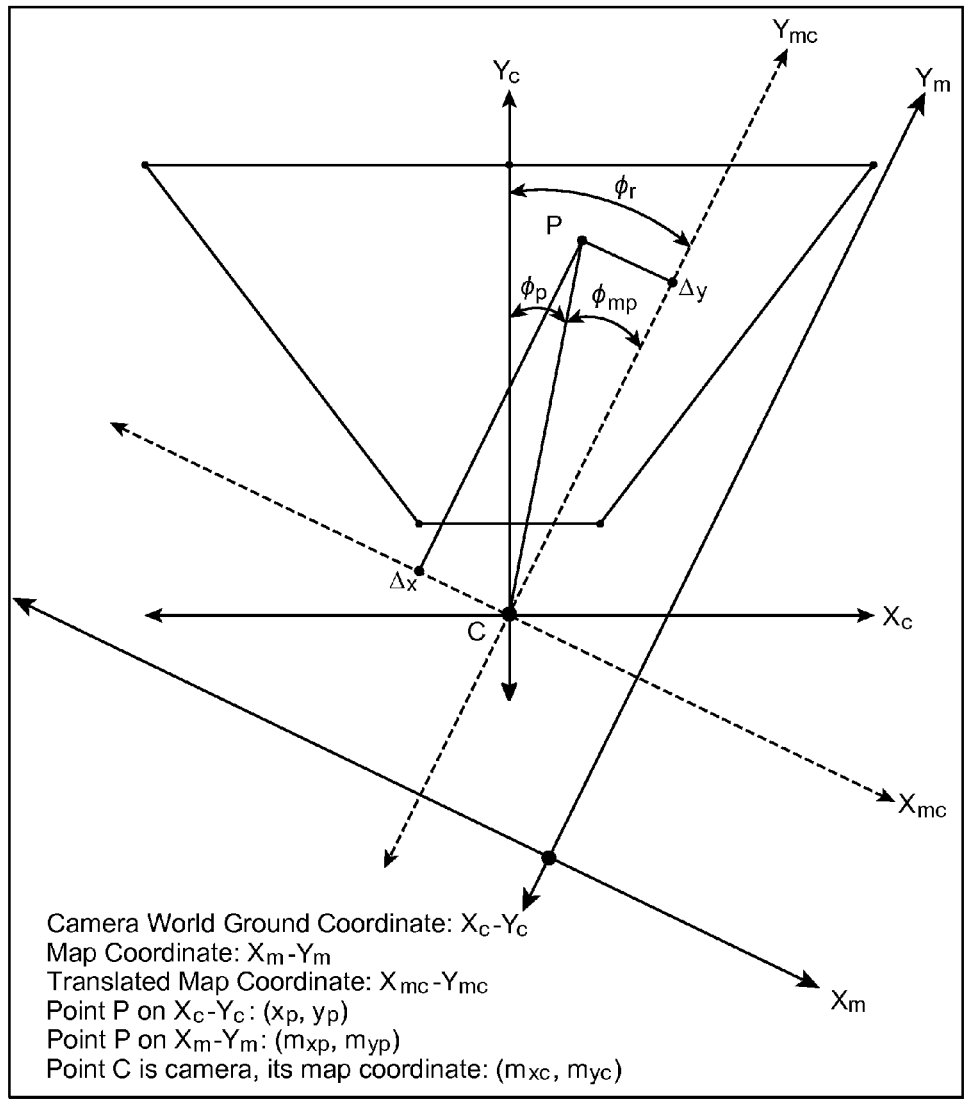

In general, the transformation parameters generated by the calibration module 44 account for translation, rotation and scaling relationships between world ground coordinates and corresponding map coordinates. FIG. 5 illustrates these relationships between world ground coordinates and map coordinates. As noted above, the transformation parameters generated by the calibration module 44 are computed based on a single reference point P, thereby reducing complexity and increasing mapping accuracy within a video surveillance system as compared to conventional linear interpolation techniques. The calibration module 44 determines the transformation parameters as follows, based on the camera height h and length per map pixel s as defined above as well as the map coordinates $(m_{xc}, m_{yc})$ of the camera, the map coordinates $(m_{xp}, m_{yp})$ of point P, and the image coordinates $(u_p, v_p)$ of the point P.

To find the title angle $\theta_0$ and rotation angle $\phi_r$ of the camera 42, the image coordinates $(u_p, v_p)$ of the reference point are first translated in order to express image position with respect to an image center located at $(0, 0)$. This translation is performed as follows:

$$u_p = u_p - (I_w/2), \quad v_p = v_p - (I_h/2).$$

Next, the tilt angle $\theta_0$ of the camera 42 is calculated in terms of the angles of horizontal displacement and vertical displacement from a center of the image to the target location within the image, denoted respectively as $t_p$ and $q_p$. The displacement angles are first obtained based on the following:

$$F = I_w/(2 \cdot \tan(\alpha))$$

$$\tan(t_p) = v_p \cdot A_p / F$$

$$t_p = \tan^{-1}(v_p \cdot A_p / F)$$

$$\tan(q_p) = \frac{u_p}{\sqrt{F^2 + (v_p \cdot A_p)^2}}$$

$$\cos(q_p) = \frac{\sqrt{F^2 + (v_p \cdot A_p)^2}}{\sqrt{F^2 + (v_p \cdot A_p)^2 + u_p^2}}$$

Figure 6:
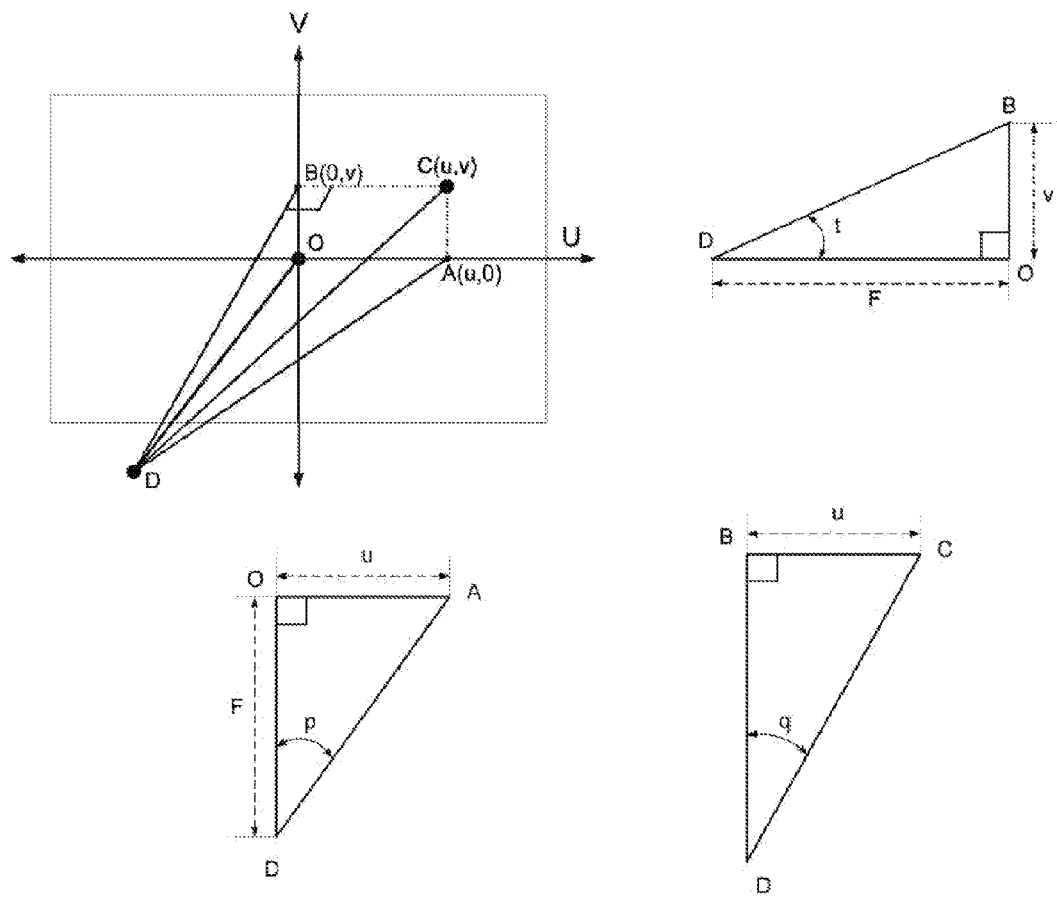

The intermediate angles t, q and p utilized herein are illustrated with reference to the reference points defined herein in FIG. 6. As shown in FIG. 6 and utilized in this description, angle t corresponds to $t_p$ and angle q corresponds to $q_p$.

Next, the x and y components of the map distance between the camera and the reference point, respectively denoted as $\Delta_x$ and $\Delta_y$, are obtained as follows:

$$\Delta_x = s \cdot (m_{xp} - m_{xc}), \Delta_y = s \cdot (m_{yp} - m_{yc}).$$

From the above, the tilt angle of the camera $\theta_0$ is obtained as follows:

$$\sin(\theta_p) = h/d_p = h/\sqrt{h^2 + \Delta_x^2 + \Delta_y^2},$$

$$\theta_0 = \sin^{-1}\left(\frac{\sin(\theta_p)}{\cos(q_p)}\right) - t_p,$$

where $\theta_p$ is the tilt angle of the camera as seen at the reference point and $d_p$ is the three-dimensional distance between the camera and the reference point.

Using the above parameters, the rotation angle $\phi_r$ of the camera can similarly be obtained as follows:

$$\phi_p = \tan^{-1}\left(\frac{\tan(q_p)}{\cos(\theta_0 + t_p)}\right),$$

$$\phi_{mp} = \tan^{-1}\left(\frac{\Delta_x}{\Delta_y}\right),$$

$$\phi_r = \phi_p - \phi_{mp},$$

where $\phi_p$ is the rotation angle of the camera as seen at the reference point and $\phi_{mp}$ is the rotation angle of the point P with respect to the y-axis of the map coordinate system.

From the rotation angle $\phi_r$, a rotation matrix for the camera is also generated as follows:

$$H = \begin{bmatrix} \cos(\phi_r) & -\sin(\phi_r) \\ \sin(\phi_r) & \cos(\phi_r) \end{bmatrix}.$$

As described above, the calibration module 44 computes the tilt and rotation parameters of the camera 42 during a calibration process with respect to a single reference point. The system 40 can then utilize these parameters to track the position of a target location, such as the location of an object, within an image captured by the camera 42 and an associated map. As further illustrated by FIG. 3, an object tracking module 46 identifies the location of an object or other target location within the camera image with respect to the image coordinate system. Here, this location is denoted as (u, v). From this image location, a coordinate transformation module 48 computes the world ground coordinates (x, y) of the object as follows. The world ground coordinates (x, y) are assumed to be located on the ground, therefore the z component of the coordinates is assumed to be 0 and is omitted herein for simplicity.

Initially, the coordinate transformation module translates the image coordinate frame such that the point (0, 0) in the image is moved to the center of the image from a corner of the image. This is performed as follows:

$$u = u - (I_A/2),$$

$$v = v - (I_h/2).$$

Upon translating the coordinate frame of the image, the world ground coordinates (x, y) of the target location are computed according to the following operations:

$$F = I_w/(2 \cdot \tan(\alpha)),$$

$$\tan(t) = v \cdot A_p/F,$$

$$\tan(q) = u/\sqrt{F^2 + (v \cdot A_p)^2},$$

$$y = h/\tan(\theta_0 + t),$$

$$x = h \cdot \tan(q)/\sin(\theta_0 + t).$$

Upon computing the world ground coordinates of the target location, a mapping module 50 is utilized to compute the associated map coordinates according to the following:

$$\underline{m}_p = \frac{1}{s} \cdot H \cdot \underline{w} + \underline{m}_c,$$

where $$\underline{m}_p = [m_{xp} \; m_{yp}]^T, \underline{m}_c = [m_{xc} \; m_{yc}]^T, \text{ and } \underline{w} = [x \; y]^T.$$

Figure 7:
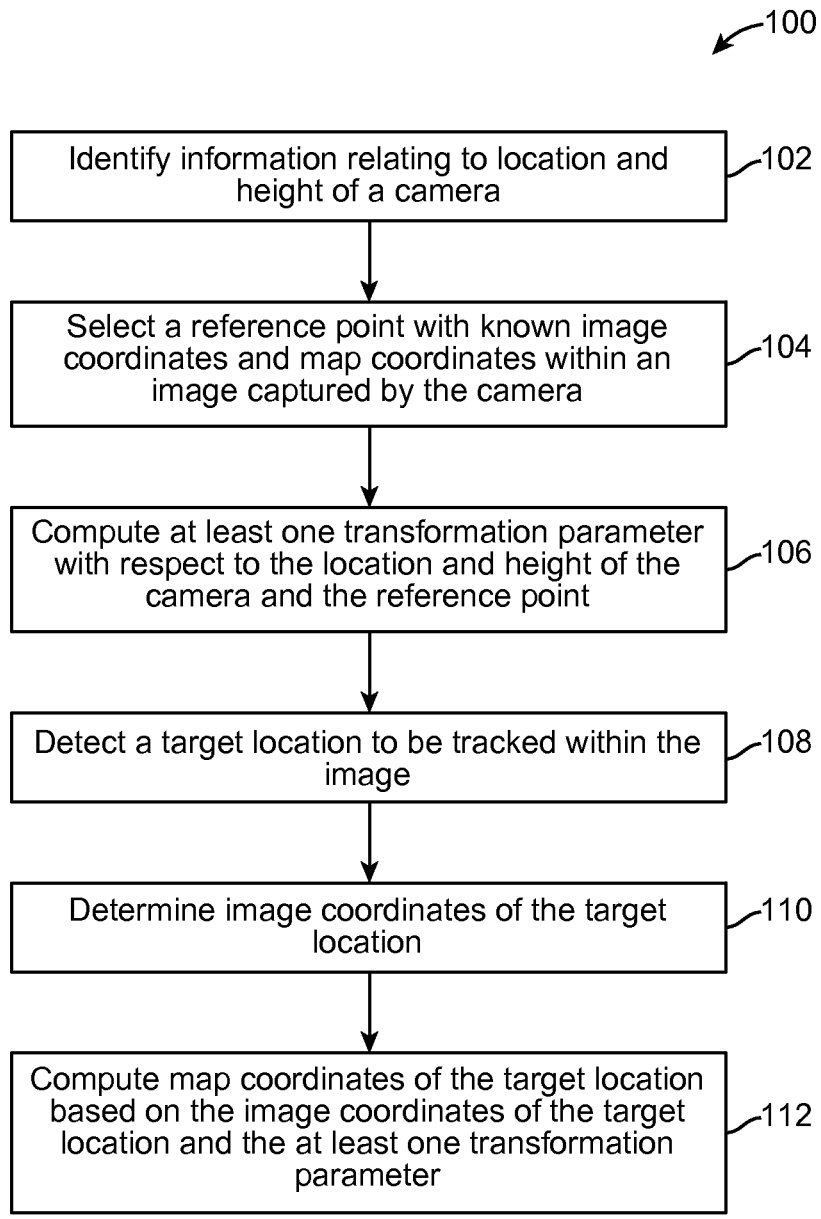
FIG. 7 is a block flow diagram of a process of identifying map coordinates of a location within an image captured by a camera.

Referring next to FIG. 7, with further reference to FIGS. 1-6, a process 100 of identifying map coordinates of a location within an image captured by a camera, such as a camera 12-16, includes the stages shown. The process 100 is, however, an example only and not limiting. The process 100 can be altered, e.g., by having stages added, removed, rearranged, combined, and/or performed concurrently. Still other alterations to the process 160 as shown and described are possible. The process 100 can be performed by one or more entities within the surveillance system, such as a host computer system 30, a location server 32, a metadata server 36, a camera 12-16, etc. One or more of the operations described in process 100 can be performed in hardware and/or in software.

The process 100 begins at stage 102, wherein information related to location and height of a camera 42 is identified. At stage 104, a reference point within the image captured by the camera 42 having known image coordinates and map coordinates is selected. At stage 106, at least one transformation parameter is computed with respect to the location and height of the camera and the reference point. These parameters can include tilt, rotation, and/or translation parameters, and may be computed by a calibration module 44 and/or other suitable mechanisms based on the calculations provided above.

At stage 108, a target location to be tracked within the image (e.g., corresponding to an object found within the image) is detected by an object tracking module 46 or the like. At stage 110, image coordinates of the target location are determined. At stage 112, the image coordinates of the target location determined at stage 110 and the transformation parameter(s) computed at stage 106 are utilized to compute map coordinates of the target location. The calculations performed at stage 112 can be performed by a coordinate transformation module 48, a mapping module 50, or the like, as described above or in any other suitable manner.

Figure 8:
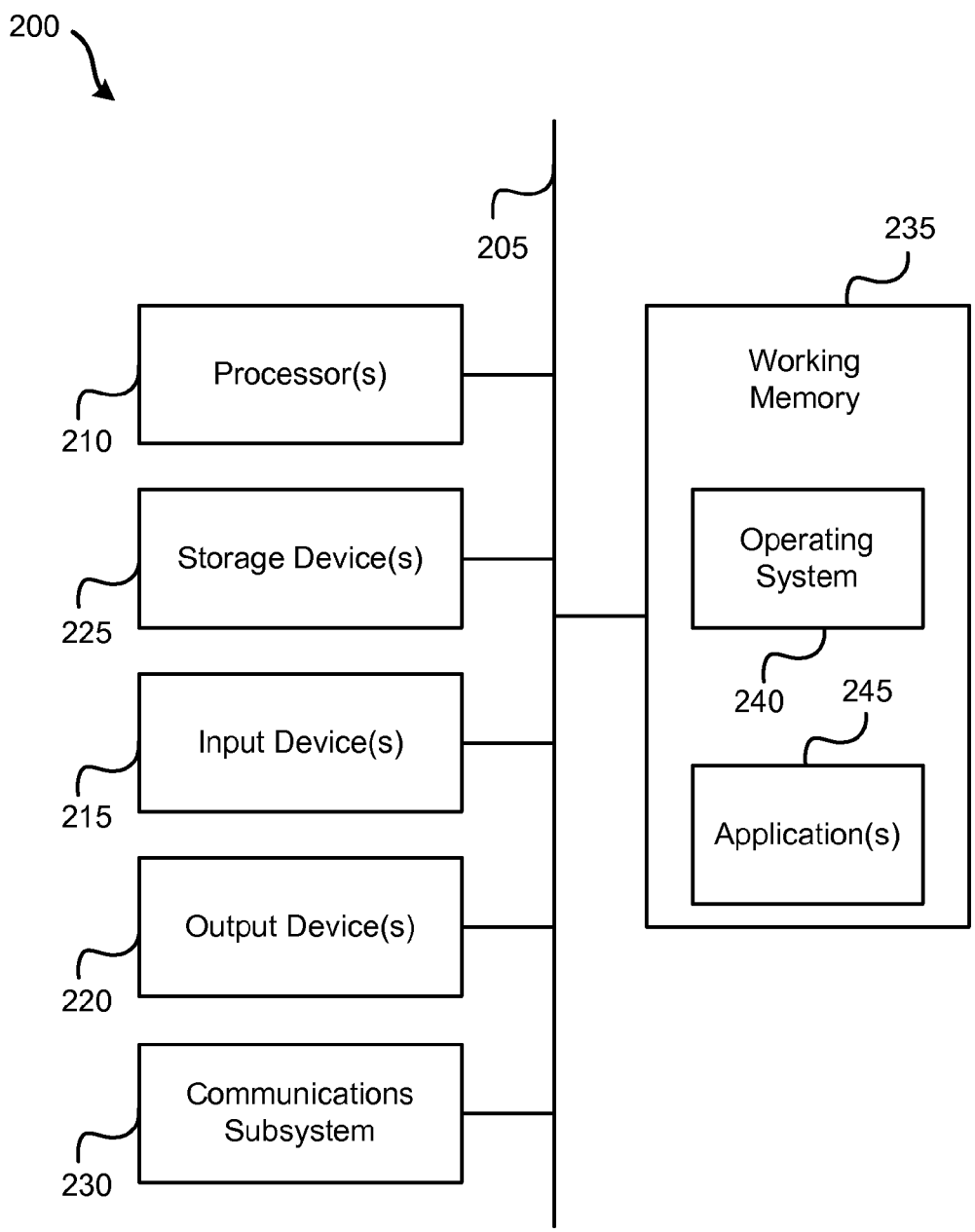
FIG. 8 illustrates a block diagram of an embodiment of a computer system.

To perform the actions of the host computer system 30, the location server 32, the metadata server 36, the user terminal 36, the calibration module 44, the coordinate transformation module 48, the mapping module 50, or any other previously described computerized system(s), a computer system as illustrated in FIG. 8 may be used. FIG. 8 provides a schematic illustration of a computer system 200 that can perform the methods provided by various other configurations, as described herein, and/or can function as the host computer system, a remote kiosk/terminal, a point-of-sale device, a mobile device, and/or a computer system. FIG. 8 provides a generalized illustration of various components, any or all of which may be utilized as appropriate. FIG. 8, therefore, broadly illustrates how individual system elements may be implemented in a relatively separated or relatively more integrated manner.

The computer system 200 is shown comprising hardware elements that can be electrically coupled via a bus 205 (or may otherwise be in communication, as appropriate). The hardware elements may include one or more processors 210, including without limitation one or more general-purpose processors and/or one or more special-purpose processors (such as digital signal processing chips, graphics acceleration processors, and/or the like); one or more input devices 215, which can include without limitation a mouse, a keyboard and/or the like; and one or more output devices 220, which can include without limitation a display device, a printer and/or the like.

The computer system 200 may further include (and/or be in communication with) one or more non-transitory storage devices 225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 200 might also include a communications subsystem 230, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 230 may permit data to be exchanged with a network (such as the network described below, to name one example), other computer systems, and/or any other devices described herein. In many configurations, the computer system 200 will further comprise a working memory 235, which can include a RAM or ROM device, as described above.

The computer system 200 also can comprise software elements, shown as being currently located within the working memory 235, including an operating system 240, device drivers, executable libraries, and/or other code, such as one or more application programs 245, which may comprise computer programs provided by various configurations, and/or may be designed to implement methods, and/or configure systems, provided by other configurations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 225 described above. In some cases, the storage medium might be incorporated within a computer system, such as the system 200. In other configurations, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 200 and/or might take the form of source and/or installable code, which, upon compilation and/or installation on the computer system 200 (e.g., using any of a variety of generally available compilers, installation programs, compression/decompression utilities, etc.), then takes the form of executable code.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some configurations may employ a computer system (such as the computer system 200) to perform methods in accordance with various configurations of the invention. According to a set of configurations, some or all of the procedures of such methods are performed by the computer system 200 in response to processor 210 executing one or more sequences of one or more instructions (which might be incorporated into the operating system 240 and/or other code, such as an application program 245) contained in the working memory 235. Such instructions may be read into the working memory 235 from another computer-readable medium, such as one or more of the storage device(s) 225. Merely by way of example, execution of the sequences of instructions contained in the working memory 235 might cause the processor(s) 210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 200, various computer-readable media might be involved in providing instructions/ code to processor(s) 210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 225. Volatile media include, without limitation, dynamic memory, such as the working memory 235. Transmission media include, without limitation, coaxial cables, copper wire and fiber optics, including the wires that comprise the bus 205, as well as the various components of the communication subsystem 230 (and/or the media by which the communications subsystem 230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 200. These signals, which might be in the form of electromagnetic signals, acoustic signals, optical signals and/or the like, are all examples of carrier waves on which instructions can be encoded, in accordance with various configurations of the invention.

The communications subsystem 230 (and/or components thereof) generally will receive the signals, and the bus 205 then might carry the signals (and/or the data, instructions, etc. carried by the signals) to the working memory 235, from which the processor(s) 205 retrieves and executes the instructions. The instructions received by the working memory 235 may optionally be stored on a storage device 225 either before or after execution by the processor(s) 210.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Further, the preceding description details techniques in the context of a security camera system. However, the systems and methods described herein may be applicable to other forms of camera systems.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of identifying map coordinates of a location within an image captured by a camera, the method comprising:

obtaining, at a location server communicatively coupled to the camera, a first image captured by the camera;

selecting, at the location server, a single reference point appearing within the first image captured by the camera, the single reference point having known image coordinates and depicting a location with known two-dimensional map coordinates in an associated two-dimensional map;

computing, at the location server, at least one transformation parameter to transform two-dimensional camera coordinate locations for a camera frame of reference to two-dimensional map coordinate locations for the associated two-dimensional map, with the at least one transformation parameter including a rotation angle and a tilt angle of the camera relative to the single reference point, based on location data for the camera and the single reference point appearing within the image captured by the camera, with the location data expressed in terms of image coordinates and map coordinates and including a location and an elevation of the camera in the map coordinates and the image coordinates and the known two-dimensional map coordinates of the single reference point;

obtaining, at the location server, a second image captured by the camera;

detecting, within the second image, a target location to be tracked;

determining, at the location server, image coordinates of the target location; and computing, at the location server, map coordinates of the target location based on the image coordinates of the target location and the at least one transformation parameter computed based on the location data for the camera and the single reference point appearing within the image captured by the camera, including the location and the elevation of the camera in the map coordinates and the image coordinates and the known two-dimensional map coordinates of the single reference point.

2. The method of claim 1 wherein computing the map coordinates of the target location comprises computing a horizontal displacement angle and a vertical displacement angle from a center of the second image to the target location within the second image.

3. The method of claim 2 wherein computing the map coordinates of the target location comprises determining a position of the target location relative to an Earth-based coordinate system based on the horizontal displacement angle, the vertical displacement angle, the location and elevation of the camera, the rotation angle and the tilt angle.

4. The method of claim 3 wherein computing the at least one transformation parameter comprises computing a rotation matrix based at least in part on the rotation angle.

5. The method of claim 4 wherein the information relating to location and elevation of the camera comprises map coordinates of the camera, and wherein computing the map coordinates of the target location further comprises computing the map coordinates of the target location based on the rotation matrix, the map coordinates of the camera, and the map coordinates of the single reference point.

6. The method of claim 1 wherein the target location is a location of an object detected in the second image, and wherein the method further comprises tracking image coordinates and map coordinates of the object.

7. The method of claim 1 wherein the camera comprises a varifocal optical system, and wherein computing the at least one transformation parameter comprises:

determining a focal length of the camera; and computing the at least one transformation parameter based on horizontal and vertical fields of view associated with the focal length of the camera.

8. The method of claim 7 wherein determining the focal length of the camera comprises:

obtaining, at the location server, a third image captured by the camera;

selecting a first reference point and a second reference point within the third image, the first reference point and the second reference point each having known image coordinates and depicting a location with known map coordinates; and determining the focal length of the camera as a function of the location and elevation of the camera, the image coordinates and map coordinates of the first reference point, and the image coordinates and map coordinates of the second reference point.

9. The method of claim 1 comprising obtaining, at the location server, a field of view value associated with the camera, wherein the at least one transformation parameter is further based on the field of view value.

10. The method of claim 1, wherein computing the map coordinates of the target location comprises:

transforming the image coordinates of the target location to world ground coordinates of the target location; and transforming the world ground coordinates of the target location to the map coordinates of the target location.

11. A target coordinate translation system comprising:

a camera configured to capture a first image and a second image, wherein the camera has a known location and elevation and a system of image coordinates is defined with respect to the first image and the second image;

a calibration module communicatively coupled to the camera and configured to identify a single reference point appearing within the first image captured by the camera, the single reference point having known image coordinates and depicting a location with known two-dimensional map coordinates in an associated two-dimensional map, and to compute at least one transformation parameter to transform two-dimensional camera coordinate locations for a camera frame of reference to two-dimensional map coordinate locations for the associated two-dimensional map, the at least one transformation parameter including a rotation angle and a tilt angle of the camera relative to the single reference point, based on location data for the camera and the single reference point appearing within the image captured by the camera, with the location data expressed in terms of image coordinates and map coordinates and including the location and elevation of the camera in the map coordinates and the image coordinates and the known two-dimensional map coordinates of the single reference point;

an object tracking module communicatively coupled to the camera and configured to select a target location within the second image and to identify image coordinates of the target location; and a coordinate transformation module communicatively coupled to the calibration module and the object tracking module and configured to compute map coordinates of the target location based on the image coordinates of the target location and the at least one transformation parameter computed based on the location data for the camera and the single reference point appearing within the image captured by the camera, including the location and the elevation of the camera in the map coordinates and the image coordinates and the known two-dimensional map coordinates of the single reference point.

12. The system of claim 11 wherein the coordinate transformation module is further configured to compute a horizontal displacement angle and a vertical displacement angle from a center of the second image to the target location within the second image.

13. The system of claim 12 wherein the coordinate transformation module is further configured to determine coordinates of the target location relative to an Earth-based coordinate system based on the horizontal displacement angle, the vertical displacement angle, the location and elevation of the camera, the rotation angle and the tilt angle.

14. The system of claim 13 wherein:

the calibration module is further configured to compute a rotation matrix based at least in part on the rotation angle; and the system further comprises a mapping module communicatively coupled to the coordinate transformation module and configured to identify map coordinates of the camera and to compute the map coordinates of the target location based on the rotation matrix, the map coordinates of the camera, and the map coordinates of the single reference point.

15. The system of claim 11 wherein:
the camera comprises a varifocal optical system; and
the calibration module is further configured to determine a focal length of the camera and to compute the at least one transformation parameter based on horizontal and vertical fields of view associated with the focal length of the camera.

16. The system of claim 15 wherein:
the camera is further configured to capture a third image, the third image being associated with the system of image coordinates; and
the calibration module is further configured to select a first reference point and a second reference point within the third image, the first reference point and the second reference point each having known image coordinates and depicting a location with known map coordinates, and to determine the focal length of the camera as a function of the location and elevation of the camera, the image coordinates and map coordinates of the first reference point, and the image coordinates and map coordinates of the second reference point.

17. A system for identifying map coordinates corresponding to a location within a captured image, the system comprising:
a camera configured to capture a first image and a second image, wherein the camera has a known location and elevation and a system of image coordinates is defined with respect to the first image and the second image;
calibration means, communicatively coupled to the camera, for selecting a single reference point appearing within the first image captured by the camera, the single reference point having known image coordinates and depicting a location with known two-dimensional map coordinates in an associated two-dimensional map, and computing at least one transformation parameter to transform two-dimensional camera coordinate locations for a camera frame of reference to two-dimensional map coordinate locations for the associated two-dimensional map, with the at least one transformation parameter including a rotation angle and a tilt angle of the camera relative to the single reference point, based on location data for the camera and the single reference point appearing within the image captured by the camera, with the location data expressed in terms of image coordinates and map coordinates and including the location and elevation of the camera in the map coordinates and the image coordinates and the known two-dimensional map coordinates of the single reference point;
tracking means, communicatively coupled to the camera, for detecting, within the second image, a target location and determining image coordinates of the target location; and
mapping means, communicatively coupled to the calibration means and the tracking means, for computing map coordinates of the target location based on the image coordinates of the target location and the at least one transformation parameter computed based on the location data for the camera and the single reference point appearing within the image captured by the camera, including the location and the elevation of the camera in the map coordinates and the image coordinates and the known two-dimensional map coordinates of the single reference point.

18. The system of claim 17 wherein the mapping means is further configured to compute a horizontal displacement angle and a vertical displacement angle from a center of the second image to the target location within the second image and to determine a position of the target location relative to an Earth-based coordinate system based on the horizontal displacement angle, the vertical displacement angle, the location and elevation of the camera, the rotation angle and the tilt angle.

19. The system of claim 18 wherein:
the calibration means is further configured to compute a rotation matrix based at least in part on the rotation angle; and
the mapping means is further configured to identify map coordinates of the camera and to compute the map coordinates of the target location based on the rotation matrix, the map coordinates of the camera, and the map coordinates of the single reference point.

20. The system of claim 17 wherein:
the camera comprises a varifocal optical system; and
the calibration means is further configured to determine a focal length of the camera and to compute the at least one transformation parameter based on horizontal and vertical fields of view associated with the focal length of the camera.

21. The system of claim 20 wherein:
the camera is further configured to capture a third image, the third image being associated with the system of image coordinates; and
the calibration means is further configured to select a first reference point and a second reference point within the third image, the first reference point and the second reference point each having known image coordinates and depicting a location with known map coordinates, and to determine the focal length of the camera as a function of the location and elevation of the camera, the image coordinates and map coordinates of the first reference point, and the image coordinates and map coordinates of the second reference point.

22. A computer program product residing on a non-transitory processor-executable computer storage medium, the computer program product comprising processor-executable instructions configured to cause a processor to:
identify information relating to a camera and a system of image coordinates relative to a first image and a second image captured by the camera;
select a single reference point appearing within the first image captured by the camera, the single reference point having known image coordinates and depicting a location with known two-dimensional map coordinates in an associated two-dimensional map;
compute at least one transformation parameter to transform two-dimensional camera coordinate locations for a camera frame of reference to two-dimensional map coordinate locations for the associated two-dimensional map, with the at least one transformation parameter including a rotation angle and a tilt angle of the camera relative to the single reference point, based on location data for the camera and the single reference point appearing within the image captured by the camera, with the location data expressed in terms of image coordinates and map coordinates and including location and elevation of the camera in the map coordinates and the image coordinates and the known two-dimensional map coordinates of the single reference point;
detect, within the second image, a target location to be tracked;
determine image coordinates of the target location; and compute map coordinates of the target location based on the image coordinates of the target location and the at least one transformation parameter computed based on the location data for the camera and the single reference point appearing within the image captured by the camera, including the location and the elevation of the camera in the map coordinates and the image coordinates and the known two-dimensional map coordinates of the single reference point.

23. The computer program product of claim 22 wherein:
the instructions configured to cause the processor to compute the map coordinates of the target location are configured to cause the processor to:
  compute a horizontal displacement angle and a vertical displacement angle from a center of the second image to the target location within the second image; and
  determine a position of the target location relative to an Earth-based coordinate system based on the horizontal displacement angle, the vertical displacement angle, the location and elevation of the camera, the rotation angle and the tilt angle.

24. The computer program product of claim 23 wherein:
the instructions configured to cause the processor to compute the at least one transformation parameter are configured to cause the processor to compute a rotation matrix based at least in part on the rotation angle;
the information relating to location and elevation of the camera comprises map coordinates of the camera; and
the instructions configured to cause the processor to compute the map coordinates of the target location are configured to cause the processor to compute the map coordinates of the target location based on the rotation matrix, the map coordinates of the camera, and the map coordinates of the single reference point.

* * * * *